Dec. 25, 1962    H. A. TOULMIN, JR    3,069,735
METHOD AND APPARATUS FOR STERILIZING WATER
Filed March 18, 1960    3 Sheets-Sheet 2

INVENTOR.
HARRY A. TOULMIN JR.
BY Toulmin & Toulmin
ATTORNEYS

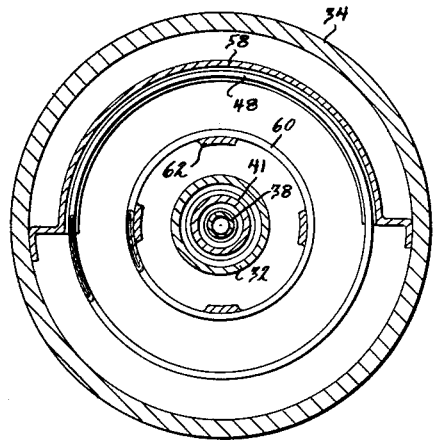
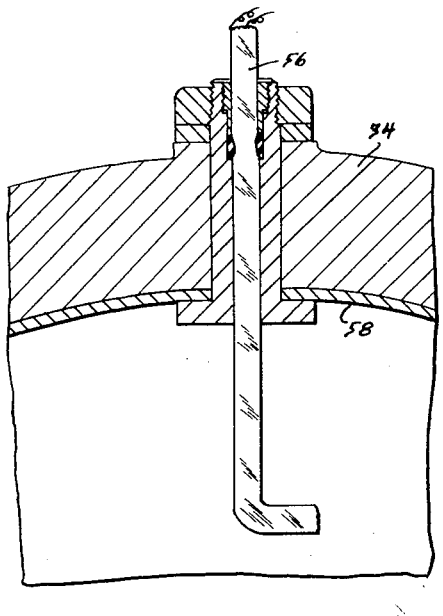
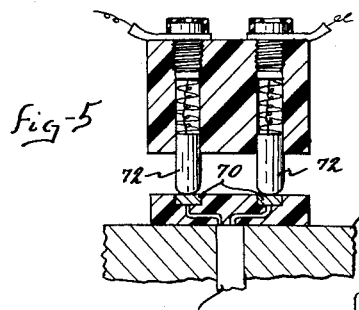
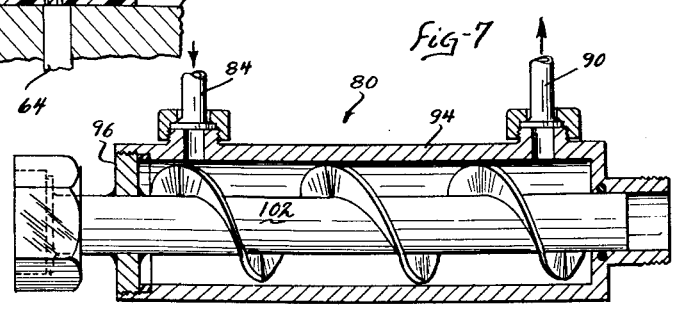
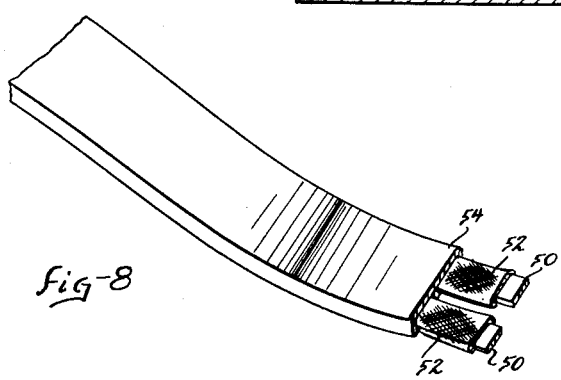

United States Patent Office 3,069,735
Patented Dec. 25, 1962

3,069,735
METHOD AND APPARATUS FOR STERILIZING WATER
Harry A. Toulmin, Jr., Dayton, Ohio, assignor to The Commonwealth Engineering Company of Ohio, Dayton, Ohio
Filed Mar. 18, 1960, Ser. No. 15,998
5 Claims. (Cl. 21—91)

This invention relates to sterilizing arrangements for water and the like and is particularly concerned with a sterilizer arrangement which is operable for sterilizing water as it is being pumped.

Many times it is the case that a water supply which is otherwise satisfactory is unusable on account of the water not being sterile. Up to the present time the sterilizing of such water has been accompanied with great difficulty and inconvenience with the possibility always existing that through inadvertence water that has not been sterilized might be consumed.

There are chemical treatments for sterilizing water but such processes are generally applicable only in regions where there is a large amount of water to be supplied, for example, in the case of a municipality. Also, such chemical treatment requires considerable apparatus and a high degree of skill to treat the water properly while still retaining the palatability thereof.

In still other cases it may be that a water supply is of such a nature that it does not always have to be sterilized and under these circumstances any large amount of equipment such as might be associated with chemical sterilization would represent an idle investment.

Having the foregoing in mind, it is a primary object of the present invention to provide an arrangement for sterilizing water as it is being pumped or drawn from the well and before it reaches a place of storage from which it is drawn for use.

A particular object of the invention is to provide an arrangement for sterilizing water as it passes through a pump associated with a well and storage tank system.

Still another object of this invention is the provision of an arrangement for heat sterilizing water in a pump as it is passing therethrough and recovering at least a portion of the heat employed for sterilizing the water and whereby to realize a substantial heat economy in the process.

A still further object of this invention is the provision of a sterilizing arrangement in a pump in which intimate contact between the sterilizing heating elements and the water is effected during the movement of the water through the pump.

Still a further object of this invention is the provision of an arrangement for providing a pump with a heat sterilizer in which the heat sterilizer is brought up to effective temperature before the pump commences to move water in the system.

These and other objects and advantages of the present invention will become more apparent upon reference to the following specification taken in connection with the accompanying drawings in which:

FIGURE 3 is a cross sectional view indicated by line 3—3 on FIGURE 2 showing the location of the sterilizer heating elements in the pump casing and the use of a shroud member within the pump casing to insure that all water pumped will necessarily pass through the sterilization zone;

FIGURE 4 is a sectional view indicated by line 4—4 on FIGURE 2 showing the manner in which an electric cable can be lead into the pump casing for connection with one of the sterilizer units;

FIGURE 5 is a sectional view showing a brush and collector ring arrangement for supplying electrical energy to another of the sterilizing units in the pump casing;

FIGURE 6 is a perspective view showing the manner in which a heat exchanger could be employed for cooling the water discharged from the pump after sterilization while simultaneously warming the water coming into the pump and which is to be sterilized;

FIGURE 7 is a longitudinal sectional view through the heat exchanger shown in FIGURE 6; and FIGURE 8 is a perspective view showing the construction of one of the sterilizer heating elements.

Figure 1:
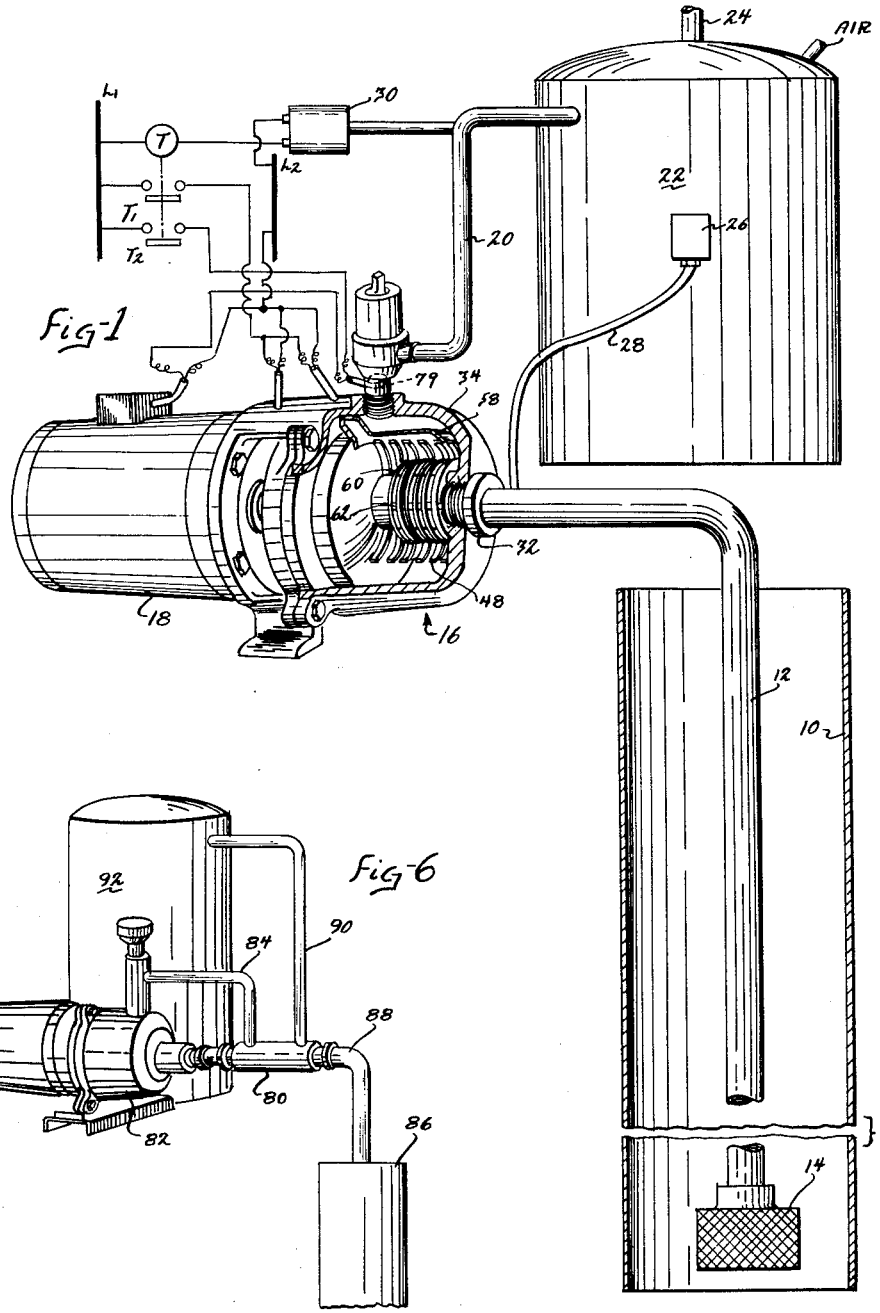
FIGURE 1 is a diagrammatic perspective view showing a pumping system having a pump with a sterilizer according to this invention.

Referring to the drawings somewhat more in detail, in FIGURE 1 is diagrammatically illustrated a well casing 10 in which there is a drop pipe 12 having a screen and foot valve 14 at the lower end. Pipe 12 is connected with the inlet of a pump generally indicated at 16 which is driven by drive motor 18. The water pumped by pump 16 is discharged through conduit 20 to a storage tank 22 which has an outgoing conduit at 24 for delivering the water to a point of use.

As it is customary in the art, a certain amount of air is to be retained in tank 22 and this is controlled by a float operated valve 26 forming a snifter which is connected by a pipe 28 to a point of suction in the pump so that when the air volume in the tank is below a predetermined amount air will be drawn in through the pump and delivered to the tank and when the air in the tank exceeds a predetermined amount the aforementioned supply of air to the pump will be interrupted.

Associated with the system is a pressure responsive switch 30 adapted for closing when the pressure in the tank 22 reaches a predetermined lower amount and for opening when the pressure reaches a predetermined higher amount. These pressures depend on the particular conditions and generally run from about 20 to 25 pounds up to 40 to 60 or 70 pounds.

Switch 30, when it closes, energizes a timer T and pertaining to a timer T is a first blade T1 connected in circuit with the sterilizer elements within the pump to be described hereinafter. When the switch closes the sterilizer elements become energized immediately from power lines L1 and L2 and thus build up to sterilization temperature. A predetermined time after switch blade T1 closes, a second timer blade T2 closes and this energizes motor 18 to put the pump into operation. By this arrangement it is insured that the sterilizer elements will be up to sterilizing temperature before the pump commences to operate.

Figure 2:
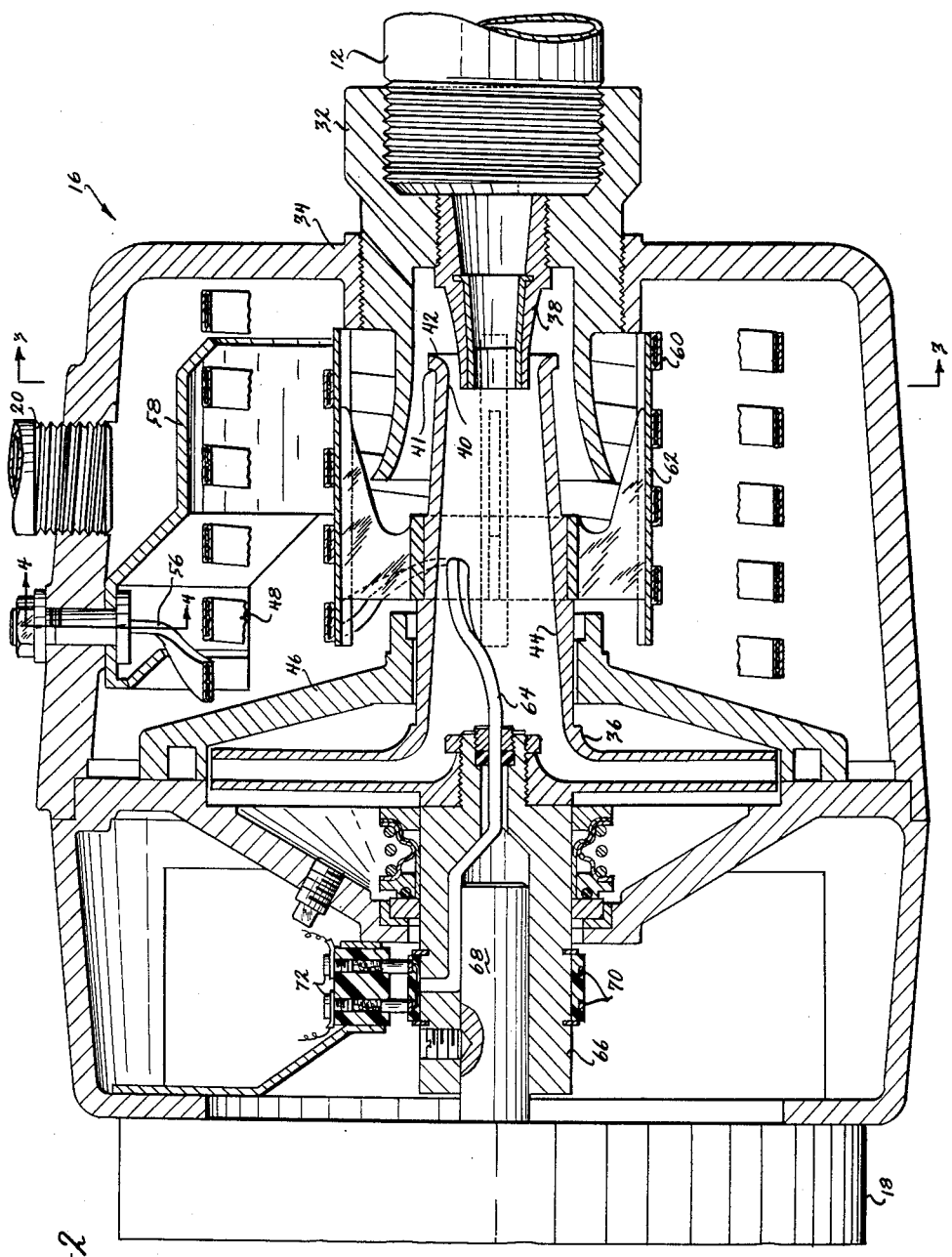
FIGURE 2 is a vertical sectional view through the pump showing the sterilizer elements therein.

Referring now to FIGURE 2 it will be noted that the conduit 12 leading from the drop pipe is connected into a fitting 32 that is threaded into the housing 34 of the pump in axial alignment with the rotary impeller 36 of the pump. Conduit 12, in the particular modification illustrated, is connected with a nozzle 38, the discharge end of which is positioned in the throat 40 of a member 41 having a venturi portion 42 which is supplied with fluid from inside the pump casing. The venturi portion 42 has a jet effect so that reduced pressure obtained in the throat of the venturi assists in causing water to flow through pipe 12 and nozzle 38. This water passes up the outwardly tapering passage 44 of member 41 to the rotary impeller 36 and enters the eye of the impeller and is then thrown out radially by the impeller into the inside of the diffuser 46 from which the pumped water issues into the housing 34 in substantially a tangential direction.

This water then passes through the housing and out through the discharge conduit 20 in the top which was referred to previously.

The member 41, it will be noted, is integral with rotary impeller 36 and thus rotates with it.

According to this invention the water in passing from the pump through the housing to the pump outlet is caused to pass over and through heated sterilizing elements. As illustrated in FIGURE 2 these elements are two in number. There is a first stationary element 48 located within the housing and in the form of a spiral. This heating or sterilizing element may comprise, for example, two ribbons 50 of resistance material such as Nichrome, or the like, which are insulated from each other by insulation 52 and which are contained within an enclosing metal sleeve 54. The two ribbons joined together at one end and at their other ends are connected with the lead in wires that form the supply cable 56, and which wires are connected in circuit with timer blade T1 as previously mentioned.

A shroud member 58 is supported within the pump housing and around the top of the spiral sterilizing element 48 so that water discharged from the pump and passing through the housing will be constrained to move longitudinally thereof so as to come into intimate contact with the sterilizing elements and thus be treated before it enters discharge conduit 20.

According to this invention a second sterilizing element is provided which advantageously rotates with the impeller 36. This sterilizing element is indicated at 60 and may be constructed in the same manner described in connection with sterilizer element 48. Sterilizing element 60 is wound in the form of a spiral about a spider 62 which may be pressed on the aforementioned member 41 projecting from the impeller. This second sterilizing element 60 is supplied with electrical energy via a cable 64 that extends through the connector fitting 66 that connects the motor output shaft 68 with the hub of the pump impeller. The cable then passes out through the side of fitting 66 where the individual wires of the cable are connected with the slip rings 70. These slip rings are engaged by the brushes 72 which in turn are connected into wires that are connected in parallel with the wires leading from the first mentioned sterilizer unit and are, further, connected therewith in circuit with timer blade T1.

The sterilizer element 60, it will be evident rotates and this provides for an agitating action on the water passing through the pump housing so that intimate contact of the water with the sterilizing element is insured.

The temperatures employed are generally from around 208 to 211° F. since this will prevent boiling of the water. These temperatures are satisfactory since the water has a substantial distance to travel longitudinally in passing over the sterilizing elements and sufficient time is thus available for effecting a high degree of sterilization of the water. In cases where the pressure in the system remains at a substantial level, it is possible to exceed 211° F. because the pressure above atmospheric existing in the system will be sufficient to prevent vaporization of the water.

The sterilizing units can operate at a considerably higher temperature where it is insured that the inside of the pump casing will always be under pressure. For example, at 20 pounds absolute the sterilizing units can operate at up to about 227° F. and at 30 pounds absolute pressure they can operate up to about 250° F. and so on as can readily be determined upon reference to a standard steam table.

An advantage of the high temperatures, whenever it would be possible to employ such high temperatures, would be that sterilization could be effected with greater rapidity and greater certainty than would be possible with the lower temperatures referred to. In many cases however, it will be necessary to limit the sterilizing temperature to about 211° F.

A thermostat 79 can be positioned at the discharge side of the pump housing and utilized to control energization of the sterilizing elements to prevent the discharged water from exceeding a predetermined temperature.

Inasmuch as the water leaving the pump will be quite hot, a considerable heat economy can be effected by including a heat exchanger in the system of the nature illustrated at 80 in FIGURE 7. This heat exchanger receives the water discharged from pump 82 by way of conduit 84 and flows the hot water from the pump in heat exchange relationship with cold water coming from well 86 via suction conduit 88 and then discharges the now somewhat cooler pump water via conduit 90 to the tank 92.

The construction of the heat exchanger 80 is illustrated in some detail in FIGURE 8 wherein it will be seen that the exchanger comprises a casing 94 having a removable cap 96 sealingly mounted on one end. Extending through the casing and fixed to the cap 96 is a finned pipe 102 which at one end communicates with the suction conduit leading directly to the inlet of the pump. It will be noted that the hot fluid entering the heat exchanger by way of conduit 84 flows in counterflow relation to the cold incoming water and is caused to spiral about the pipe 102 because of the spiral fins thereon so that considerable of the heat in the hot water is transferred to the cold incoming water, warming the incoming water, and placing less of a burden on the sterilizing units so that less power is required to maintain the sterilizing elements at the desired temperature.

Both the pump and heat exchanger are characterized in being so constructed that they can easily be taken apart for cleaning to maintain the system in efficient operating condition.

It will be understood that this invention is susceptible to modification in order to adapt it to different usages and conditions; and, accordingly, it is desired to comprehend such modifications within this invention as may fall within the scope of the appended claims.

I claim:

1. In combination; a pump housing having an inlet port and an outlet port, a pump for pumping liquid and comprising a rotatable impeller in the housing and having an inlet connected with said inlet port, said pump having a discharge line communicating with said housing whereby liquid discharged by said pump passes through the housing to the said outlet port, a plurality of sterilizng elements disposed in said housing and located between said pump and said outlet port, each of said sterilizing elements comprising electric resistance heating means over which said liquid is pumped, means for energizing said heating means to raise the temperature of said liquid to sterilization temperature, one of said heating means being rotatable whereby to agitate and admix said liquid during movement of the same by said pump to the outlet port and insure heat treatment of the entire body of liquid to sterilization temperature.

2. In combination; a pump housing having an inlet port and an outlet port, a pump in the housing operable for pumping liquids from the said inlet port to the said outlet port, said housing comprising a chamber of substantial size interposed between the pump and the outlet port through which the pumped liquid passes, and a pair of radially spaced substantially cylindrical spirally wound resistance heating elements disposed in said chamber and over which the liquid being pumped passes on its way to said outlet port, there being means for energizing said heating elements to raise the temperature of said liquid to sterilization temperature, one of said heating elements being stationary and the other being rotatable whereby to agitate and admix the liquid during its movement from the pump to the outlet port thereby to insure heat treatment of the entire body of liquid during its said travel.

3. In combination; a pump housing having an inlet port and an outlet port, a pump comprising a rotatable impeller in the housing having its inlet connected with said inlet port and having its discharge side opening into the housing whereby liquid discharged by the pump passes through the housing to the said outlet port, a pair of sterilizing elements in the housing located between the pump and the said outlet port, each sterilizing element comprising a spirally wound electric resistance heating element, means for energizing said sterilizing element, one of said elements being stationarily mounted in the housing and the other said elements being mounted on said impeller to rotate therewith, and shroud means in the housing located between the outlet port and said sterilizing elements whereby the water discharged from the pump is constrained to pass over said sterilizing elements in moving from the pump to the said outlet port.

4. In combination; a pump housing having an inlet port and an outlet port, a pump mounted on a horizontal axis in said housing and comprising a rotatable impeller having its inlet connected with said inlet port and having its discharge side opening into the housing whereby liquid discharged by the pump passes through the housing to said outlet port, a pair of substantially cylindrical spirally wound resistance heating elements in said housing located between the pump and said outlet port, said resistance heating elements being concentric and substantially co-extensive and also concentric with said rotatable impeller, one of said resistance heating elements being mounted on said impeller so as to rotate therewith and the other thereof being stationarily mounted in said housing, shroud means in the housing between the outlet port and the sterilizing elements whereby the water discharged from the pump is constrained to pass over said sterilizing elements in moving from the pump to the said outlet port, means for supplying electrical energy to said stationary sterilizing element extending through a wall of said housing, and means extending through the drive shaft for said impeller for supplying electrical energy to the sterilizing element mounted on the impeller to rotate therewith.

5. In combination; a pump housing having an inlet port and an outlet port, a centrifugal pump in the housing operable for pumping liquids from said inlet port to said outlet port, said housing comprising a chamber of substantial size interposed between the pump and the outlet port through which the pumped liquid passes, and a pair of substantially cylindrical spirally wound resistance heating elements disposed in said chamber substantially co-extensive with each other and co-axial and on the axis of said pump, means for supplying electrical energy to said heating elements to raise the temperature of the liquid passing thereover to sterilization temperature, one of said heating elements being stationary and the other being rotatable whereby to agitate and admix the liquid during its movement from the pump to the outlet port thereby to insure heat treatment of the entire body of liquid during its said travel.

References Cited in the file of this patent

UNITED STATES PATENTS

| | | |
|---|---|---|
| 1,457,634 | Neri | June 5, 1923 |
| 1,871,688 | Heller | Aug. 16, 1932 |
| 2,132,708 | Smith | Oct. 11, 1938 |
| 2,355,887 | Moule | Aug. 15, 1944 |
| 2,578,673 | Cushman | Dec. 18, 1951 |
| 2,756,470 | Sawchuk | July 31, 1956 |
| 2,941,474 | Hall | June 21, 1960 |
| 2,952,001 | Morey | Sept. 6, 1960 |